United States Patent
Hochmayr et al.

(10) Patent No.: US 9,476,486 B2
(45) Date of Patent: Oct. 25, 2016

(54) PNEUMATICALLY ASSISTED CONTINUOUSLY VARIABLE TRANSMISSION

(71) Applicant: BRP-POWERTRAIN GMBH & CO. KG, Gunskirchen (AT)

(72) Inventors: Markus Hochmayr, Krenglbach (AT); Norbert Korenjak, Stadl-Paura (AT); Johann Wilflinger, Linz (AT); Thomas Hindinger, Neuhofen an der Krems (AT); Roger Rioux, Sherbrooke (CA)

(73) Assignee: BRP-POWERTRAIN GMBH & CO. KG, Gunskirchen (AT)

( * ) Notice: Subject to any disclaimer, the term of this patent is extended or adjusted under 35 U.S.C. 154(b) by 0 days.

(21) Appl. No.: 14/432,383

(22) PCT Filed: Sep. 27, 2013

(86) PCT No.: PCT/US2013/062125
§ 371 (c)(1),
(2) Date: Mar. 30, 2015

(87) PCT Pub. No.: WO2014/052725
PCT Pub. Date: Apr. 3, 2014

(65) Prior Publication Data
US 2015/0267792 A1    Sep. 24, 2015

Related U.S. Application Data

(60) Provisional application No. 61/707,241, filed on Sep. 28, 2012.

(51) Int. Cl.
*F16H 59/00*    (2006.01)
*F16H 61/00*    (2006.01)
(Continued)

(52) U.S. Cl.
CPC ........... *F16H 9/125* (2013.01); *F16H 55/563* (2013.01); *F16H 61/6624* (2013.01); *F16H 63/065* (2013.01)

(58) Field of Classification Search
CPC ........... F16H 55/563; F16H 61/66245; F16H 55/56; F16H 61/662; F16H 61/66259
USPC ...................................... 474/14, 28
See application file for complete search history.

(56) References Cited

U.S. PATENT DOCUMENTS 2,999,574 A * 9/1961 Dodge ............. F16H 61/66245
                                                     192/3.54
3,017,783 A * 1/1962 Van Der Brugghen ......... F16H 61/66263
                                                     474/14

(Continued)

FOREIGN PATENT DOCUMENTS

WO      2012129417 A1    9/2012

OTHER PUBLICATIONS

International Search Report of PCT/US2013/062125; Shane Thomas, Mar. 6, 2014.

(Continued)

*Primary Examiner* — Henry Liu
(74) *Attorney, Agent, or Firm* — BCF LLP

(57) ABSTRACT

A CVT pulley includes a shaft having disposed thereon, a first and second sheave, and a spider. A spring biases the sheaves away from one another. The axially moveable second sheave is disposed axially between the axially fixed spider and the first sheave. A plurality of centrifugal weights, connected to either the spider or the second sheave, have a portion that moves radially outward with rotation of the shaft. The axial distance between the spider and the second sheave depends at least in part on the radial position of the portion which depends on the rotational speed. At least one cylinder is adapted to receive fluid. At least one piston, rotatable with the shaft, is adapted to move in the at least one cylinder in response to fluid being received therein, thereby selectively exerting force on one of the sheaves towards the other. CVTs and vehicles are also disclosed.

22 Claims, 9 Drawing Sheets

(51) Int. Cl.
*F16H 63/00* (2006.01)
*F16H 9/12* (2006.01)
*F16H 63/06* (2006.01)
*F16H 55/56* (2006.01)
*F16H 61/662* (2006.01)

(56) References Cited

U.S. PATENT DOCUMENTS

| | | | | |
|---|---|---|---|---|
| 3,052,132 | A * | 9/1962 | Karig | F16H 61/662 474/18 |
| 3,200,666 | A | 8/1965 | Schrodt et al. | |
| 3,269,207 | A * | 8/1966 | Borsattino | F16H 61/66263 474/14 |
| 3,280,648 | A * | 10/1966 | Nelson | F16H 61/66245 474/14 |
| 3,557,640 | A * | 1/1971 | Hendriks et al. | F02D 9/00 192/222 |
| 3,653,283 | A * | 4/1972 | Betz | F16H 61/66263 474/12 |
| 3,698,256 | A * | 10/1972 | Albertson | F16H 55/563 474/12 |
| 3,771,378 | A * | 11/1973 | Knobel | F16H 61/66245 474/14 |
| 3,868,862 | A * | 3/1975 | Bessette | F16H 61/66227 474/12 |
| 3,881,370 | A * | 5/1975 | Vogelaar | A01D 69/06 474/18 |
| 3,939,720 | A * | 2/1976 | Aaen | F16H 55/563 474/14 |
| 4,206,659 | A * | 6/1980 | Rijsdijk | F16H 61/66236 474/14 |
| 4,284,408 | A * | 8/1981 | Boer | F16H 61/66245 192/105 C |
| 4,483,686 | A * | 11/1984 | Kobayashi | F16H 55/563 474/11 |
| 4,493,221 | A * | 1/1985 | Stieg | F16H 61/66245 474/11 |
| 4,589,858 | A * | 5/1986 | Gaddi | F16H 61/66227 474/12 |
| 4,637,277 | A * | 1/1987 | Gaddi | B60W 30/18 474/12 |
| 5,399,123 | A * | 3/1995 | Blackburn | F16H 55/563 474/16 |
| 5,421,784 | A * | 6/1995 | Robert | F16H 55/563 474/13 |
| 5,460,575 | A * | 10/1995 | Berto | F16H 61/66245 474/11 |
| 5,529,544 | A * | 6/1996 | Berto | F16H 61/66245 474/11 |
| 5,879,253 | A * | 3/1999 | Friedmann | F16H 59/14 474/18 |
| 6,086,492 | A * | 7/2000 | Nakano | F16H 55/563 474/14 |
| 6,149,540 | A * | 11/2000 | Johnson | F16H 61/66227 474/14 |
| 6,309,317 | B1 * | 10/2001 | Joss | F16D 43/06 474/13 |
| 6,811,504 | B2 * | 11/2004 | Korenjak | F01B 1/12 474/13 |
| 6,962,543 | B2 * | 11/2005 | Roby | F16H 55/56 474/14 |
| 7,163,477 | B1 * | 1/2007 | Sherrod | F16H 55/563 474/14 |
| 8,091,657 | B2 * | 1/2012 | Dieter | B60B 3/142 180/291 |
| 2002/0032088 | A1 * | 3/2002 | Korenjak | F01B 1/12 474/14 |
| 2002/0033295 | A1 * | 3/2002 | Korenjak | F01B 1/12 180/292 |
| 2002/0155909 | A1 * | 10/2002 | Roby | F16H 55/56 474/14 |
| 2003/0221890 | A1 * | 12/2003 | Fecteau | B62J 1/12 180/210 |
| 2004/0248680 | A1 * | 12/2004 | Haas | F16H 9/18 474/35 |
| 2005/0192697 | A1 | 9/2005 | Walter | |
| 2011/0118066 | A1 * | 5/2011 | Fujimura | F16H 61/12 474/28 |
| 2011/0226538 | A1 * | 9/2011 | Brady | B60B 3/142 180/54.1 |
| 2012/0179344 | A1 * | 7/2012 | Rioux | F16H 61/66272 701/61 |
| 2012/0238384 | A1 | 9/2012 | Lee et al. | |
| 2014/0349792 | A1 * | 11/2014 | Aitcin | F16H 9/125 474/13 |

OTHER PUBLICATIONS

Supplementary European Search Report of European Application No. 13841958.5; EPO; Vasilis Hassiotis; Munich; Jun. 24, 2016.

* cited by examiner

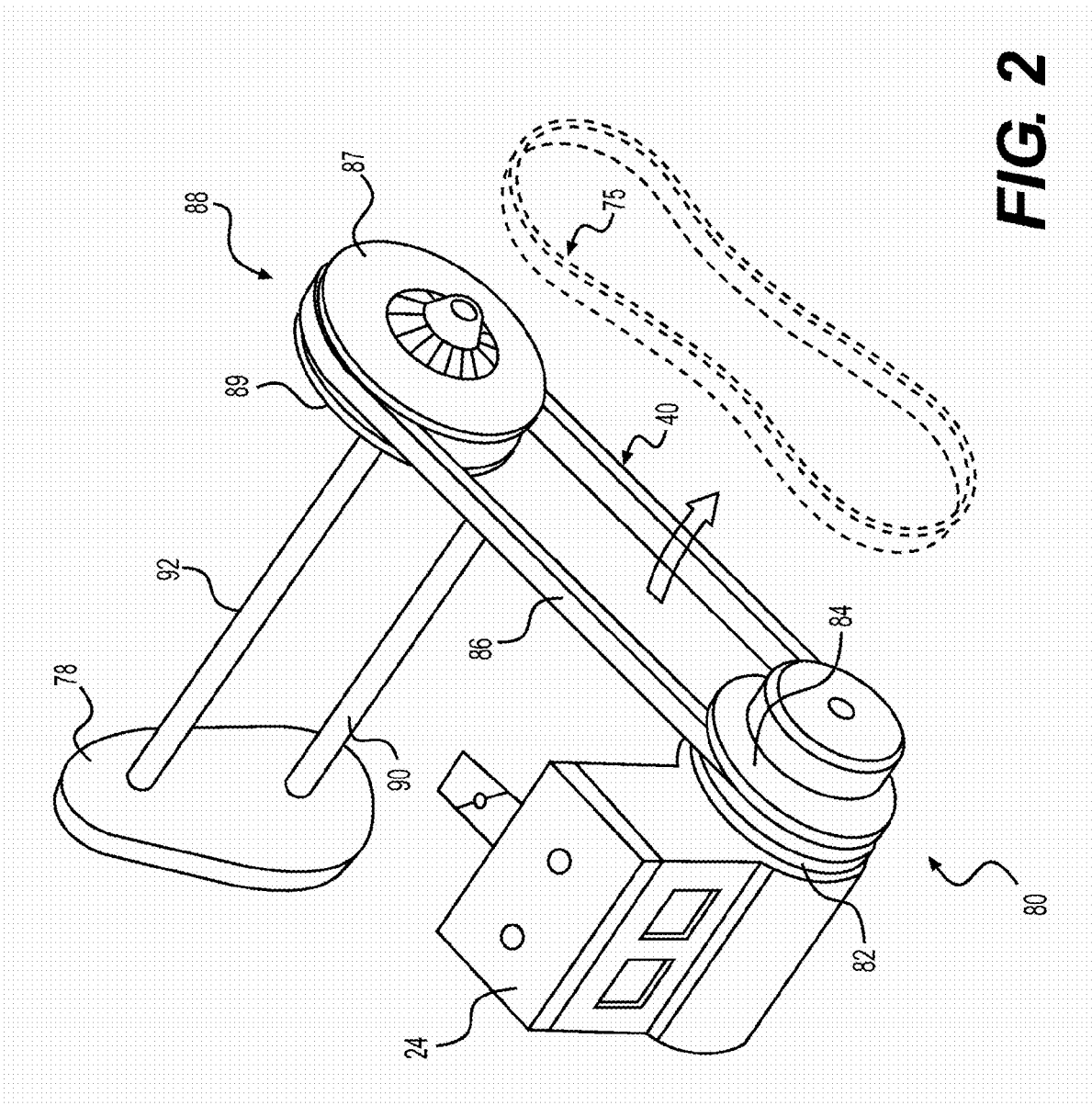

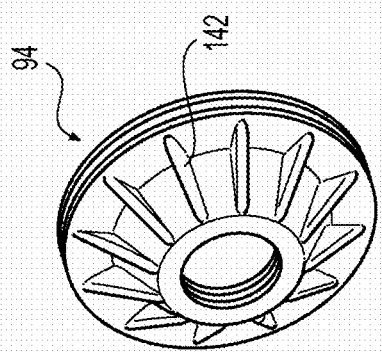
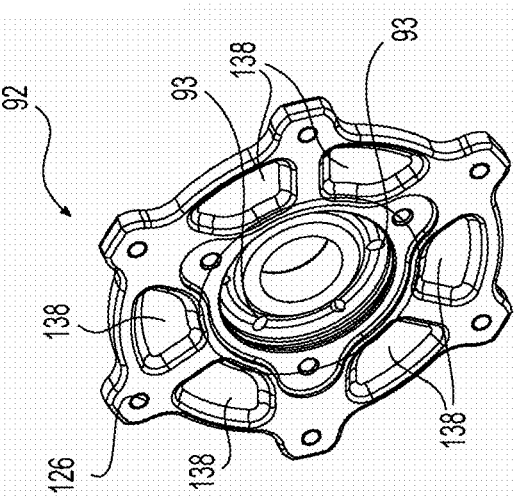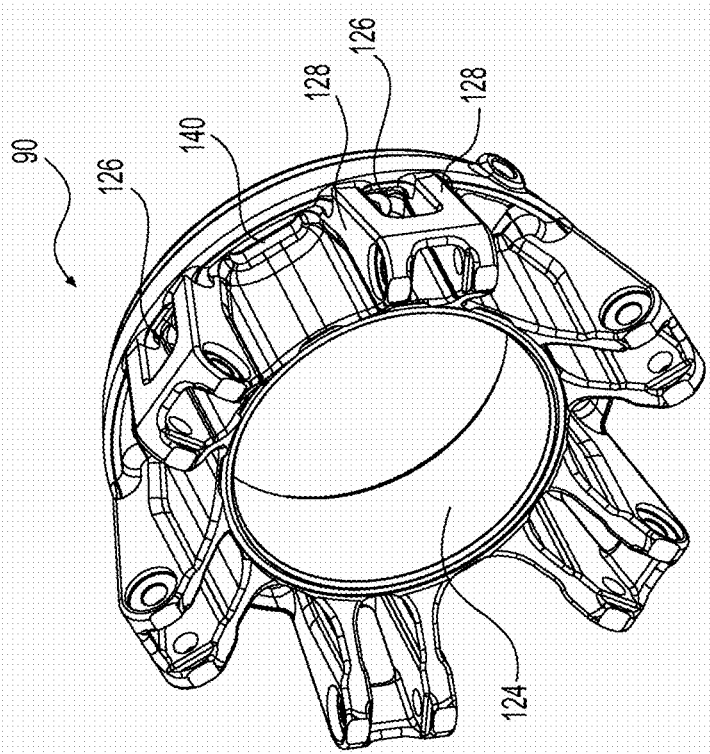
FIG. 5
FIG. 6
FIG. 4

PNEUMATICALLY ASSISTED CONTINUOUSLY VARIABLE TRANSMISSION

CROSS-REFERENCE

The present application claims priority to U.S. Provisional Application No. 61/707,241, filed on Sep. 28, 2012, the entirety of which is incorporated herein by reference.

FIELD OF THE INVENTION

The present invention relates generally to continuously variable transmissions.

BACKGROUND

Endless belt type continuously variable transmissions (CVT) are used in many types of vehicles such as snowmobiles, all terrain vehicles (ATVs), scooters and the like to obtain an infinite number of gear ratios between the engine and the vehicle's wheels. Typically, the CVTs are mechanically controlled by means of centrifugal weights (usually on the driving side) acting against the force of a spring to provide the desired gear ratios. CVT characteristics, including variation of the gear ratio as a function of engine speed, vehicle speed, torque and the like, can be tailored by appropriate choice of flyweights and spring on the driving side, and the cams on the driven side.

Mechanically controlled CVTs have limited control options as the configuration of the different components cannot be changed on-the-fly based on operating conditions. Mechanically controlled CVTs can have poor power efficiency due to frictional losses arising from the belted construction. Furthermore, when driving at constant high speeds, the engine, and other related elements inside the engine, operating at high rotational speeds (RPM) cause undesirable noise and vibrations, as well as high fuel consumption.

In some CVTs, especially in stationary applications, the mechanical controls have been replaced by a pneumatic or hydraulic system for changing the CVT gear ratio. Schrodt et al., in U.S. Pat. No. 3,200,666, issued Aug. 17, 1965 describes a CVT in which the driving pulley is acted upon by a piston to change the CVT gear ratio. U.S. Pat. No. 6,811,504, issued Nov. 2, 2004 to Korenjak et al., describes a CVT provided with a pneumatic system on the driven side to facilitate braking.

Such fully controlled CVTs, where one or both of the pulleys is controlled, whether hydraulically, pneumatically or electrically, require the attachment of additional components to the CVT, such as pumps and reservoirs, adding to its weight and cost. Furthermore, in such systems any loss of CVT control could result in the vehicle becoming inoperable.

There is thus a need for a CVT that is robust, reliable, efficient and versatile, and which allows for adjustments of its configuration based on vehicle operating conditions.

SUMMARY

It is an object of the present invention to ameliorate at least some of the inconveniences present in the prior art.

In one aspect, a pulley for a continuously variable transmission includes a shaft. A first sheave disposed on the shaft has a belt engaging surface. A second sheave disposed on the shaft has a belt engaging surface facing the belt engaging surface of the first sheave. A spring biases the first sheave and the second sheave away from one another. A spider is mounted on the shaft. The second sheave is disposed axially between the spider and the first sheave. The second sheave is axially moveable. The spider is axially fixed. The first sheave, the second sheave and the spider are adapted to rotate with the shaft. A plurality of centrifugal weights is connected to one of the spider and the second sheave. At least a portion of each of the plurality of centrifugal weights moves in a radially outward direction with respect to the shaft in response to rotation of the shaft. A radial position of the portion depends on a rotational speed of the shaft, the axial distance between the spider and the second sheave depends at least in part on the radial position of the portion. The pulley also includes at least one cylinder adapted to receive fluid therein, and at least one piston. The at least one piston is moveable in the at least one cylinder in response to the at least one cylinder receiving fluid therein, and to thereby selectively exerting force on one of the first and second sheaves towards the other of the first and second sheaves.

In a further aspect, at least one piston selectively exerts force on the second sheave.

In another aspect, the fluid is pressurized air and the at least one piston is actuated pneumatically.

In yet another aspect, the spring is connected to the second sheave.

In an additional aspect, the piston selectively exerts force on the second sheave, and the first sheave is axially fixed.

In another aspect, the at least one cylinder is formed at least partly by the spider.

In a further aspect, a coverplate seals the at least one cylinder.

In another aspect, the at least one piston includes at least one rod attached thereto. The at least one rod is disposed inside the of the at least one cylinder. The one of the at least one piston selectively exerts force on the second sheave via the at least one rod.

In an additional aspect, the at least one piston comprises at least one rod attached thereto. The at least one rod is disposed inside the cylinder corresponding to the one of the at least one piston. The at least one piston selectively exerts force on the one of the first and second sheaves via the at least one rod.

In another aspect, a fluid conduit is connected to the at least one cylinder.

In yet another aspect, a connector connects the fluid conduit with the cylinder.

In a further aspect, the connector is rotatable with the shaft.

In another aspect, the fluid conduit is rotationally fixed.

In yet another aspect, the fluid conduit is rotationally fixed.

In an additional aspect, each of the plurality of centrifugal weights is connected to the second sheave.

In another aspect, each of the plurality of centrifugal weights is either a roller weight or a lever. The roller weight is movable in a radially outward direction. The lever has a first end and a second end. The first end is attached to the one of the spider and the second sheave. The second end is pivotable away from the one of spider and the second sheave. The second end is pivotable in a radially outward direction with respect to the shaft.

In another aspect, the present provides a CVT comprising a driving pulley according to any of the above described aspects. The CVT further comprises a driven pulley having a driven pulley shaft. A first driven pulley sheave and a second driven pulley sheave are mounted on the driven pulley shaft to rotate therewith. A belt engaging surface of the first driven pulley sheave faces a belt engaging surface of the second driven pulley sheave. An endless belt rotationally couples the driving pulley and the driven pulley. The endless belt is being held between the belt engaging surfaces of the first and second sheaves of the driving pulley and the belt engaging surfaces of the first and second driven pulley sheaves.

In yet another aspect, the present provides a vehicle having a frame, an engine supported by the frame and a ground engaging member operatively connected to the engine and connected to the frame. The vehicle also includes a CVT according to the second aspect. The shaft of the driving pulley is operatively connected to a crankshaft of the engine, and the driven pulley shaft is connected to the ground engaging member.

In a further aspect, a fluid source is in fluid communication with the at least one piston.

In an additional aspect, a control system controls actuation of the at least one piston.

In another aspect, the control system adjusts the force exerted by the piston.

In another aspect, the control system adjusts the force based on at least one of the following: manual input, vehicle driving speed, operational speed of the engine, and torque required to drive the ground engaging member.

For purposes of the present application, terms related to spatial orientation when referring to a vehicle and components in relation to the vehicle, such as "forwardly", "rearwardly", "left", "right", "above" and "below", are as they would be understood by a driver of a vehicle, with the vehicle in a straight ahead orientation (i.e. not steered left or right), and in an upright position (i.e. not tilted).

Embodiments of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 2 is a perspective view, taken from a front, left side, of a powertrain of the snowmobile of FIG. 1;

FIG. 4 is a perspective view, taken from a front, right side of a spider of the driving pulley of FIG. 3A;

FIG. 5 is a perspective view, taken from a front, right side of a piston of the driving pulley of FIG. 3A;

FIG. 6 is a perspective view, taken from a rear, left side of a cover plate of the driving pulley of FIG. 3A;

DETAILED DESCRIPTION

The present invention will be described with respect to a snowmobile. However, it is contemplated that the invention could be used in other vehicles, such as, but not limited to, a motorcycle, a three-wheel vehicle and an all-terrain vehicle (ATV). Aspects of the invention could also be applied to motorized devices, other than vehicles, that use a continuously variable transmission (CVT).

Figure 1:
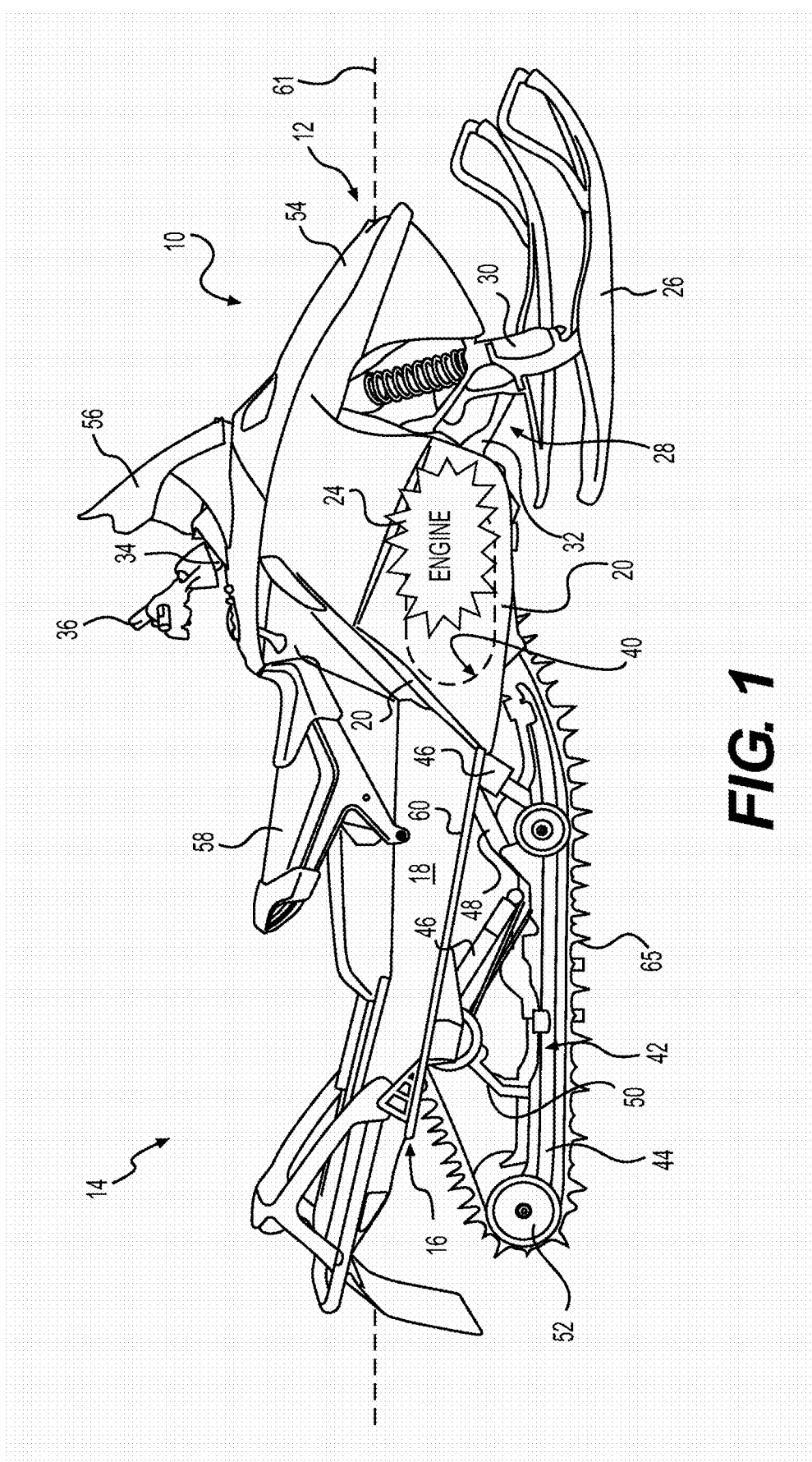
FIG. 1 is a right side elevation view of a snowmobile.

Turning now to FIG. 1, a snowmobile 10 includes a forward end 12 and a rearward end 14 which are defined consistently with a forward travel direction. The snowmobile 10 has a frame 16 that includes a tunnel 18, an engine cradle portion 20 and a front suspension assembly portion 22. The tunnel 18, generally formed of sheet metal bent in an inverted U-shape, extends rearwardly along the longitudinal axis 61 of the snowmobile 10 and is connected at the front to the engine cradle portion 20. An engine 24, shown schematically in FIG. 1, is carried by the engine cradle portion 20 of the frame 16.

A straddle-type seat 58 is positioned atop the frame 16 to accommodate a driver. A rear portion of the seat 58, which may include a storage compartment, can be used to accommodate a passenger. Two footrests 60 are positioned on opposite sides of the snowmobile 10 below the seat 58 to accommodate the driver's feet.

Two skis 26 are positioned at the forward end 12 of the snowmobile 10 and are attached to the frame 16 through a front suspension assembly 28. The front suspension assembly 28 includes ski legs 30, supporting arms 32 and ball joints (not shown) for operatively connecting the respective skis 26 to a steering column 34. A steering device such as a handlebar 36, positioned forward of the seat 58, is attached to the upper end of the steering column 34 to allow the driver to rotate the ski legs 30 and thus the skis 26, in order to steer the snowmobile 10.

An endless drive track 65 is positioned at the rear end 14 of the snowmobile 10. The drive track 65 is disposed generally under the tunnel 18, and is operatively connected to the engine 24 through CVT 40 illustrated schematically by broken lines and which will be described in greater detail below. The endless drive track 65 is driven to run about a rear suspension assembly 42 for propulsion of the snowmobile 10. The rear suspension assembly 42 includes a pair of slide rails 44 in sliding contact with the endless drive track 65. The rear suspension assembly 42 also includes one or more shock absorbers 46 and suspension arms 48 and 50 to attach the slide rails 44 to the frame 16. One or more idler wheels 52 are also provided in the rear suspension assembly 42.

At the front end 12 of the snowmobile 10, fairings 54 enclose the engine 24 and the CVT 40, thereby providing an external shell that protects the engine 24 and the CVT 40. The fairings 54 include a hood and one or more side panels which can be opened to allow access to the engine 24 and the CVT 40 when this is required, for example, for inspection or maintenance of the engine 24 and/or the CVT 40. A windshield 56, connected to the fairings 54 near the front end 12 of the snowmobile 10, acts as a windscreen to lessen the force of the air on the driver while the snowmobile 10 is moving.

The engine 24 is an internal combustion engine. The internal construction of the engine 24 may be of any known type and can operate on the two-stroke or four-stroke principle. The engine 24 drives a crankshaft 57 (FIG. 3A) that rotates about a horizontally disposed axis 85 (FIG. 3A) that extends generally transversely to the longitudinal axis 61 of the snowmobile 10. The crankshaft 57 drives the CVT 40, as described in greater detail below, for transmitting torque to the endless drive track 65 for propulsion of the snowmobile 10.

FIG. 2 illustrates schematically a powertrain 75 of the snowmobile 10. The powertrain 75 includes the engine 24, the CVT 40 and a fixed-ratio reduction drive 78. The CVT 40 includes a driving pulley 80 coupled directly to rotate with the crankshaft 57 of the engine 24 and a driven pulley 88 coupled to one end of a transversely mounted jackshaft 92 which is supported on the frame 16 by bearings. As illustrated, the transversely mounted jackshaft 92 traverses the width of the engine 24. The opposite end of the transversely mounted jackshaft 92 is connected to the input member of the reduction drive 78 and the output member of the reduction drive 78 is connected to a drive axle 90 carrying sprocket wheels (not shown) that form a driving connection with the drive track 65. Typically, the input member of the reduction drive 78 consists of a small sprocket connected to the transverse jackshaft 92 and coupled to drive an output member consisting of a larger sprocket connected to the drive axle 90 through a driving chain, all enclosed within the housing of the reduction drive 78.

In this particular example, the driving pulley 80 rotates at the same speed as the crankshaft 57 of the engine 24 whereas the speed of rotation of the transverse jackshaft 92 is determined in accordance with the instantaneous ratio of the CVT 40. The drive axle 90 rotates at a lower speed than the transverse jackshaft 92 because of the action of the reduction drive 78. It is contemplated that the driving pulley 80 could be coupled to an engine shaft other than the crankshaft 57, such as an output shaft, a counterbalance shaft, or a power take-off shaft driven by and extending from the engine 24. Similarly, it is contemplated that the driven pulley 88 could be coupled to a shaft other than the transverse jackshaft 92, such as directly to the drive axle 90 or any other shaft operatively connected to the ground engaging element of the vehicle (i.e. the drive track 65 in the case of the snowmobile 10).

The driving pulley 80 of the CVT 40 includes a pair of opposed frusto-conical sheaves, 82 and 84, between which the endless belt member 86 is held. The driving pulley 80 will be described in greater detail below. The driven pulley 88 includes a pair of frusto-conical sheaves, 87 and 89, holding the endless belt member 86 between them.

The gear ratio of the CVT 40 is defined as the ratio of the effective diameter of the driven pulley 88 to the effective diameter of the driving pulley 80. The effective diameters of the pulleys 80, 88 are determined by the radial position of the belt 86 held between the two sheaves, 82 and 84, 87 and 89, of the respective pulleys 80, 88. The radial position of the belt 86 held between two sheaves, 82 and 84, 87 and 89, changes with the separation between the sheaves, 82 and 84, 87 and 89. Since the length of the belt 86 remains constant, there is an inverse relationship between the effective diameters of the driving and driven pulleys 80, 88. When the belt 86 moves radially outwards on the driving pulley 80 (i.e. when the driving pulley sheaves, 82 and 84, move towards each other), thereby increasing the effective diameter of the driving pulley 80, the belt 86 has to move radially inwards on the driven pulley 88 (i.e. the driven pulley sheaves, 87 and 89, are moved away from each other), thereby decreasing effective diameter of the driven pulley 88, and changing the CVT gear ratio.

The engine 24 transmits torque via the crankshaft 57 to the driving pulley 80 to rotate the driving pulley 80. The separation between the driving pulley sheaves, 82 and 84, and the effective diameter of the driving pulley 80 is controlled by an adjusting mechanism that will be described in greater detail below. The belt 86 is engaged by the sheaves 82, 84 of the driving pulley 80 as described above. The belt 86, in turn, engages the driven pulley 88, rotating the sheaves, 87 and 89, changing the separation therebetween, and the effective diameter of the driven pulley 88 as described above. Torque is thus transferred from the engine 24 to the driving pulley 80, the belt 86, the driven pulley 88 and finally to the drive axle 90.

When the CVT gear ratio is large (low gear), the driving pulley 80 rotates several times for each rotation of the driven pulley 88. This configuration is desirable in certain situations such as, for example, during acceleration of the snowmobile 10, where it is necessary to transfer a large torque to the driving pulley 88, and thereby to the drive axle 90.

When the CVT gear ratio is small (high gear), each rotation of the driving pulley 80 results in multiple rotations of the driven pulley 88. This is useful in certain situations, such as, for example, when the snowmobile 10 is being driven at constant and high speeds.

Turning now to FIGS. 3A to 7, 9 and 10, the driving pulley 80 will be described in more detail.

As discussed above, the driving pulley 80 includes a pair of sheaves 82 and 84, both of which rotate together with the crankshaft 57 about a rotation axis 85 of the driving pulley 80. The term "axial direction", as used herein in relation to the driving pulley 80, refers to a direction parallel to the rotation axis 85.

The inner and outer sheaves 82, 84 each have a belt-engaging surface 83. The belt 86 is held between the belt-engaging surface 83 of the driving sheaves 82, 84. The inner sheave 82, disposed between the outer sheave 84 and the engine 24, is fixed in the axial direction, and is therefore referred to as the fixed sheave 82. The outer sheave 84 can move toward or away from the fixed sheave 82 in the axial direction in order to change the drive ratio of the CVT 40, and is therefore referred to as the movable sheave 84. It is contemplated that both sheaves 82, 84 could be moveable in the axial direction.

The sheaves 82, 84 of the driving pulley 80 are mounted on a driving shaft 100 which is rotationally coupled to the crankshaft 57. A portion 101 of the driving shaft 100 is taper-fitted on the end of the crankshaft 57. A bolt 102 is inserted into the driving shaft 100 from an end opposite the portion 101 and screwed into the end of the crankshaft 57 to retain the driving shaft 100 on the crankshaft 57. It is contemplated that the driving shaft 100 could be rotationally coupled to the crankshaft 57 in other known manners. For example, the driving shaft 100 could engage the crankshaft 57 via splines.

The fixed sheave 82 is press-fit on the inner end of the driving shaft 100 so as to be axially fixed and to rotate therewith.

The moveable sheave 84 is mounted on the driving shaft 100 axially outwards of the fixed sheave 82. The moveable sheave 84 is mounted on the driving shaft 100 on bearing sleeves 104 so as to be slidable in the axial direction.

An annular spring chamber 110, coaxial with the driving shaft 100, is defined between the moveable sheave 84 and the driving shaft 100. A helical compression spring 116 is disposed inside the spring chamber 110, coaxial with the driving shaft 100. A flange 112 extending radially outwards from the outer surface of the driving shaft 100 into the spring chamber 110 forms a spring stop. The spring 116 is held in the spring chamber 110 between the axially fixed spring stop 112 and an axially moveable outer wall 114 formed by a portion of the moveable sheave 84. This arrangement of the spring 116 biases the movable sheave 84 away from the fixed sheave 82.

It is contemplated that the spring 116 could be held between a portion of the fixed sheave 82 and a portion of the moveable sheave 84, or an element fixedly connected to the slidably moveable sheave 84. It is also contemplated that the spring 116 could be held between a portion of the moveable sheave 84 and an axially fixed portion of the driving pulley 80, other than the flange 112, as long as the axially fixed portion is disposed axially inward of the portion of moveable sheave 84.

A number of centrifugal weights 120 are mounted on the outer surface of the moveable sheave 84. In the illustrated embodiment, the centrifugal weights are in the form of flyweights or levers 120 having one end 121 attached to the outer surface of the moveable sheave 84, and the other end 122 being free to pivot away from the moveable sheave 84. When the moveable sheave 84 is at rest, the free end 122 of the centrifugal levers 120 rests against its outer surface. As the rotational speed of the moveable sheave 84 increases, the free end 122 pivots away from the moveable sheave 84 and radially outwards with respect to the driving shaft 100.

A spider 90 and coverplate 92 are mounted on the driving shaft 100, axially outward of the moveable sheave 84, so as to rotate with the driving shaft 100. The coverplate 92 is fixed to the driving shaft 100 by the bolt 102 that retains the driving shaft 100 to the crankshaft 57. The spider 90 is fixed to the coverplate 92 by bolts inserted into holes 126 near its outer periphery. The spider 90 and the coverplate 92 thus rotate with the driving shaft 100.

The spider 90 has a cylindrical hub 124 that extends coaxially around the driving shaft 100, and is spaced therefrom. The spider 90 has six six pairs of flanges 128 extending inwards towards the moveable sheave 84. The six pairs of flanges 128 are radially distributed along the outer periphery. Each pair of flanges 128 has a roller 130 mounted rotatably between the ends thereof. Each roller 130 is in contact with a corresponding one of the centrifugal levers 120 of the moveable sheave 84. The flange pairs 128 also engage complementary flanges 129 of the moveable sheave 84 so that the moveable sheave 84 rotates with the spider 90, and therefore with the driving shaft 100, about the axis 85. Each complementary flange 129 of the moveable sheave 84 is received in the space between adjacent flange pairs 128 of the spider 90.

The spider 90 is made of aluminum. It is contemplated that the spider 90 could be made of other suitable materials. As can be seen in FIG. 4, the spider 90 has a plurality of apertures 140 formed radially outwards of the hub 124 and between the flange pairs 128. The apertures 140 serve to reduce weight. It is contemplated that the apertures 140 could be omitted.

The coverplate 92 is made of aluminum. It is contemplated that the coverplate 92 could be made of other suitable materials. As can be seen in FIG. 6, a plurality of cavities 138 are formed in the surface of the coverplate 92 facing away from the moveable sheave 84. The cavities 138 are formed for the purpose of the weight reduction. It is contemplated that the cavities 138 could be omitted.

Figure 3A:
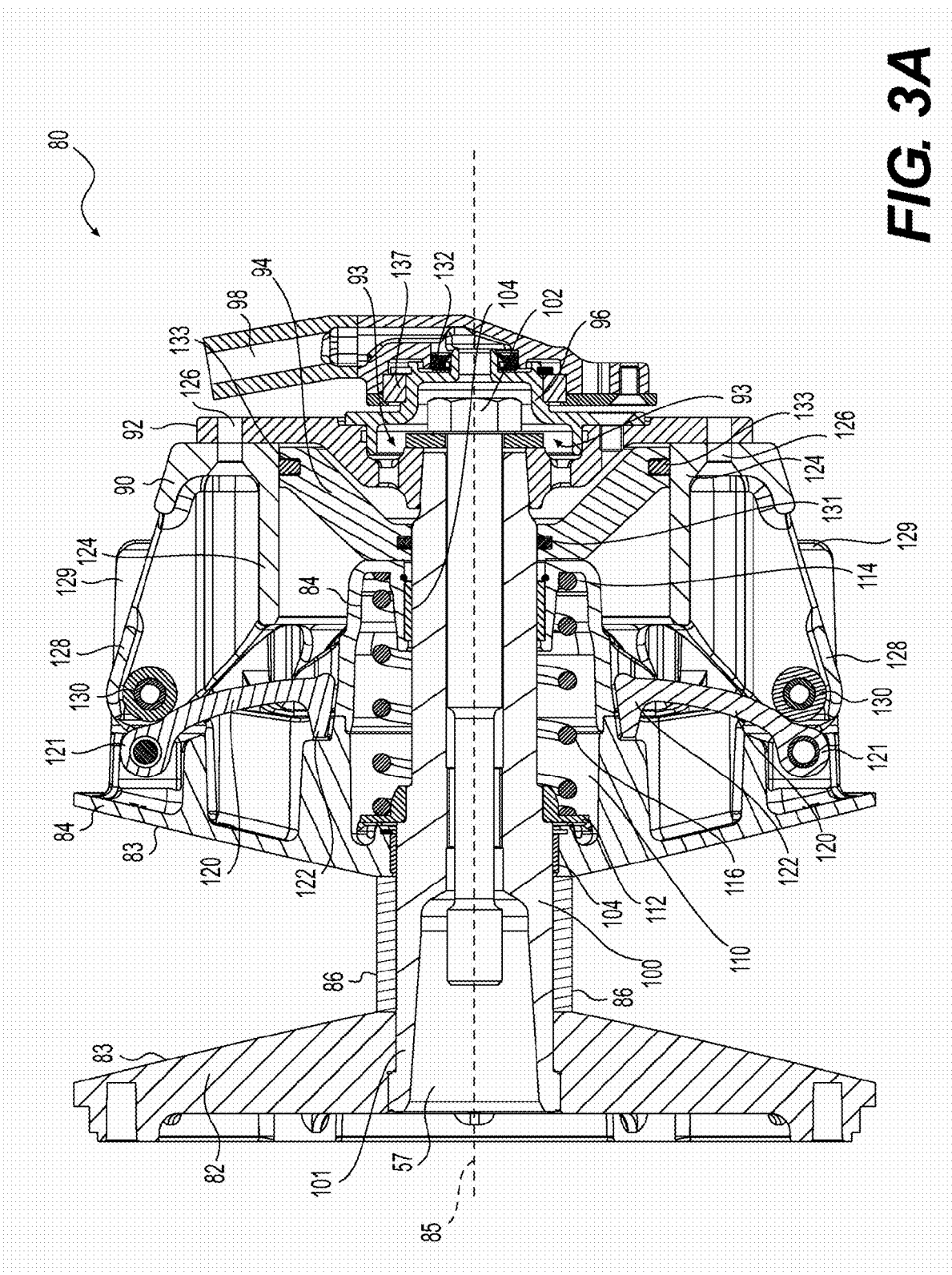
FIG. 3A is a cross-sectional view of a driving pulley of a continuously variable transmission (CVT) of the powertrain of FIG. 2, with the driving pulley in an inactive configuration.
Figure 3B:
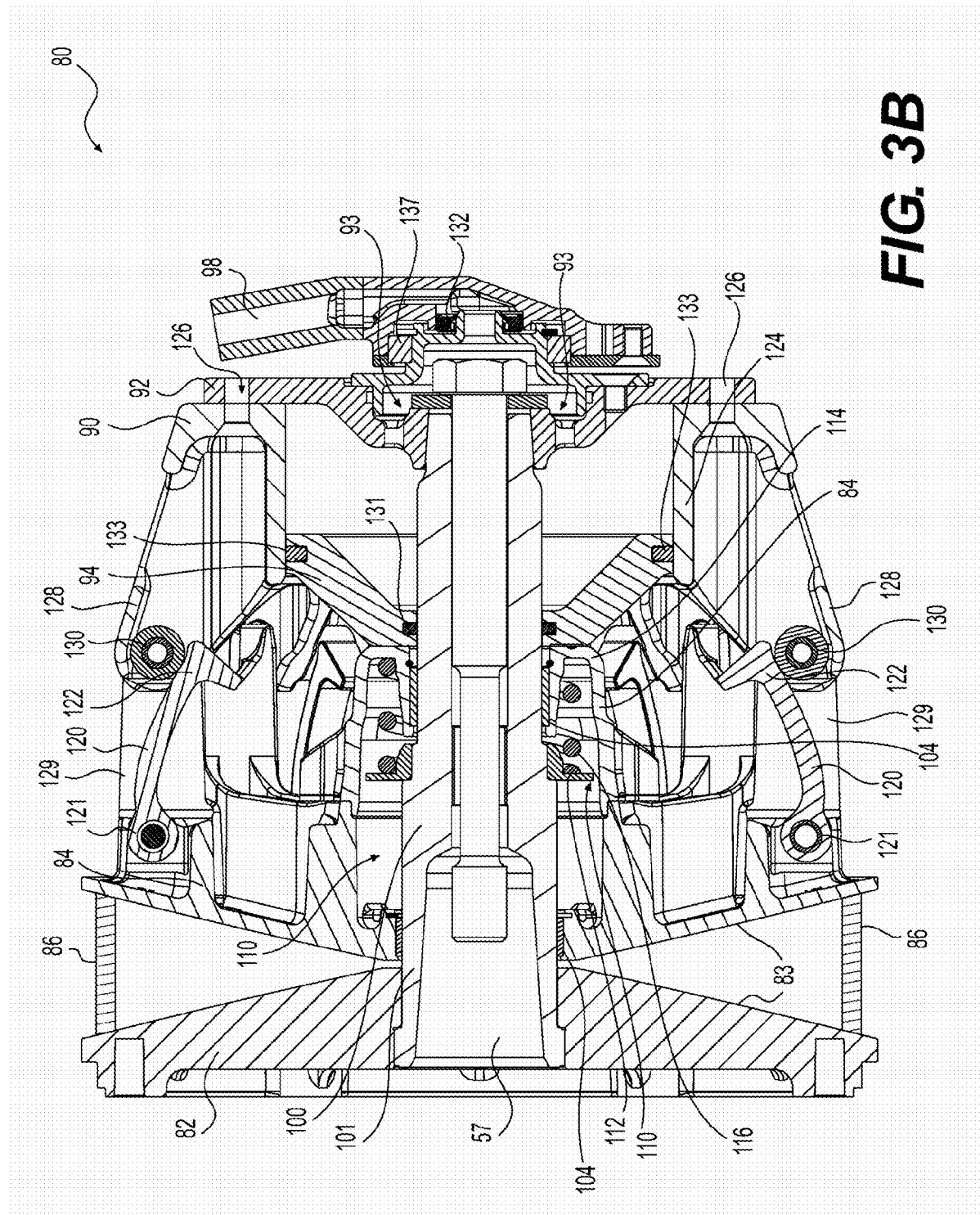
FIG. 3B is a cross-sectional view of the driving pulley of FIG. 3A in an active configuration.

At low engine operational speeds (RPM), the fixed sheave 82 and the moveable sheave 84 of the driving pulley 80 are positioned as illustrated in FIG. 3A. At high engine RPMs, the sheaves 82, 84 are positioned as shown in FIG. 3B. The centrifugal weights 120, which help to make this change in configuration, form part of the adjustment mechanism for adjusting the CVT gear ratio.

With reference to FIG. 3A, when the driving shaft 100, and thus the moveable sheave 84 and spider 90 are at rest, the moveable sheave 84 is at its outermost position on the driving shaft 100 and at maximum separation with respect to the fixed sheave 82. In this configuration, the rollers 130 of the spider 90 are in contact with the levers 120 near the end 121 attached to the moveable sheave 184.

As the moveable sheave 84 rotates faster, the free end 122 of the levers 120 extend outwards pushing against the rollers 130, and pushing the moveable sheave 84 away from the spider 90 towards the fixed sheave 82. The point of contact of the lever 120 with the roller 130 moves from the end 121 attached to the moveable sheave 84 towards the free end 122 of the lever 120.

With reference to FIG. 3B, when the moveable sheave 84 is at its innermost position on the driving shaft 100, and at its closest position to the fixed sheave 82, the free ends 122 of the levers 120 are in contact with the rollers 130 of the spider 90. This configuration of the driving pulley 80 is achieved at high rotational speeds of the driving shaft 100.

It is contemplated that the centrifugal weights 120 could be attached to the spider 90 so as to be in contact with the moveable sheave 90, and to push the moveable sheave 84 away from the spider 90 with increasing rotational speed of the spider 90. It is also contemplated that the centrifugal weights could be in the form of roller weights that roll radially outwards with increasing rotational speed of the driving pulley 80. In such an embodiment, surfaces in contact with the roller weights are sloped such that the roller weights can push the moveable sheave away from the spider 90.

When the moveable sheave 84 is pushed towards the fixed sheave 82, the compressed spring 116 exerts a force on the moveable sheave 84 to bias it away from the fixed sheave 82, i.e. in a direction opposite to the force exerted on the moveable sheave 84 due to the centrifugal weights 120. The balancing of these opposing forces, partly determines the axial position of the moveable sheave 84. Thus, the centrifugal weights 120 form the mechanical part of the adjustment mechanism for the CVT gear ratio.

A piston 94, is slidably mounted on the driving shaft 100, axially inwards of the coverplate 92, and inside the cylindrical hub 124 of the spider 90. The piston 94 is sealed against the outer surface of the driving shaft 100 by a seal 131 received in a groove formed in the inner cylindrical surface of the piston 94. The piston 94 is sealed against the inner surface of the cylindrical hub 124 by a seal 133 received in a groove formed in the outer cylindrical surface of the piston 94. The cylindrical hub 124 thus forms a cylinder for the piston 94. The piston 94 is moved away from the coverplate 92 by filling the space between the piston 94 and the coverplate 92 with pressurized air as will be described below.

In this embodiment, the stationary moveable sheave 84 (i.e. moveable sheave 84 in its outermost axial position) abuts the piston 94 when it is not actuated, as shown in the configuration of FIG. 3A. It is contemplated that the stationary moveable sheave 84 could be spaced from the piston 94 in its unactuated configuration. It is also contemplated that the piston 94 could be attached to the moveable sheave 84, so as to slide and rotate with the moveable sheave 84. It is contemplated that the piston 94 could be disposed in a cylinder that does not form part of the spider 90. It is also contemplated that the piston 94 could have a different shape than as shown herein. It is contemplated that a plurality of pistons, with a corresponding number of cylinders, could be provided to apply force on the moveable sheave 84.

The piston 94 is made of plastic to minimize its weight. As can be seen in FIG. 5, ridges 142 extend radially along the surface of the piston 94 facing the moveable sheave 84. The ridges 142 enhance rigidity of the piston 94. It is contemplated that the ridges 142 could be omitted. It is contemplated that the piston 94 can be made of any suitable material. For example, the piston 94 could be made of metal as will be discussed below with reference to FIGS. 9 and 10.

A connector 96 mounted on the coverplate 92 connects an air conduit 98 to the interior of the cylinder 124 via air passages 93 formed in the coverplate 92. The connector 96 rotates with the coverplate 92 while the air conduit 98 is stationary. Bearings 137 are inserted between the stationary air conduit 98 and the connector 96. The connector 96 is rotatably sealed against the stationary air conduit 98 via lip seals 132. When pressurized air is fed through the air conduit 98 to the cylinder 124, the piston 94 slides away from the coverplate 92 pushing the moveable sheave 84 towards the fixed sheave 82 and increasing the effective diameter of the driving pulley 80. Thus, the force exerted on the moveable sheave 84 by the piston 94 is in the same direction as that exerted on the moveable sheave 84 due to the centrifugal weight mechanism.

As explained above, in general, a higher engine RPM causes faster rotation of the driving pulley 80, increasing the force exerted on the moveable sheave 84 due to the centrifugal weights 120, resulting in a larger effective diameter for the driving pulley 80 (i.e. a smaller effective diameter for the driven pulley 88) and a lower gear ratio for the CVT 40. Thus, the gear ratio of the CVT is determined by the operation speed of the engine 24.

The pneumatically actuated piston 94 modifies the response curve of the driving pulley 80. The driving pulley 80 achieves a larger effective diameter for a given engine RPM when the centrifugal weight mechanism is assisted by the pneumatically actuated piston 94 than when the pneumatic piston 94 is not actuated. The pneumatically actuated piston 94 effectively shifts the snowmobile 10 into a higher gear with a smaller engine RPM than would be possible with a CVT 40 controlled solely by mechanical means (i.e. centrifugal weights 120). When the pressure is released so that the piston 94 is no longer actuated, the spring 116 returns the moveable sheave 84 to its initial position so that the CVT 40 returns to its purely mechanical characteristics with the effective diameter of the driving pulley 80, and thus the CVT gear ratio, being determined solely by the centrifugal weights 120.

Thus, the CVT 40 is fully operational with and without the pneumatic piston 94 being actuated. The pneumatic piston 94 permits the CVT gear ratio to be controlled independently of the engine RPM. For example, the CVT gear ratio can be adjusted based on consideration of factors such as, torque required by the drive axle 90, fuel consumption, driver comfort, or the like. The pneumatic pressure actuating the piston 94 can also be adjusted to achieve the response curve desired. For example, the CVT 40 can be configured to maximize fuel economy, or performance, or to optimize both. The pneumatically actuated piston 94 can also be used to simulate the response of a multi-gear transmission.

An electrical compressor 220 (FIG. 8) disposed elsewhere on the snowmobile 10 is used to provide pressurize air for actuating the piston 94. The compressor 220 includes an air-water separator to help prevent or minimize moisture inside the CVT 40. It is contemplated that a mechanical compressor could be used instead. It is contemplated that the compressor 220 could be any suitable compressor that is capable of achieving the requisite air pressure for actuation of the piston 94. It is also contemplated that the compressor 220 could be powered by an engine other than the engine 24, a motor or battery as appropriate.

The air pressure applied to the piston 94 and the resultant piston force that fully converges the moveable and fixed sheaves 82, 84 toward each other is much smaller for the CVT 40 of the embodiment illustrated in FIGS. 3A and 3B, than for a CVT in which the gear ratio is solely pneumatically controlled. The size of the pump or compressor 220 required to produce this piston force is much smaller than one required for a fully pneumatically-controlled CVT, resulting in energy and space savings for the snowmobile 10.

An accumulator 222 (FIG. 8), serving as a reservoir of compressed air, is installed between the pump 220 and the cylinder 124 in order to ensure a short response time for actuation of the piston 94 under all operating conditions, and to limit pressure fluctuations.

It is also contemplated that pressurized gas cartridges could be used instead of the compressor 220 and accumulator 222 to provide pressurized air for actuation of the piston 94.

The particular values of pneumatic pressure applied, force exerted, and the accumulator volume are based on the particular configuration of the pulley 80, including the size, shape and weight of its various components. In general, using higher pneumatic pressures to actuate the piston and apply force on the moveable sheave 84 provides for a greater amount of control over the CVT 40 characteristic. On the other hand, a higher pneumatic pressure also increases the size, cost and energy consumption of the compressor used. It is contemplated that the size, shape of the piston and/or cylinder 124 could be different from that shown in FIGS. 3A to 6. A smaller piston 94 and/or cylinder 124, i.e. having a smaller cross-sectional area in the direction normal to the rotation axis 85, would need to be actuated by a higher pneumatic pressure to exert a given force on the moveable sheave 84.

Figure 9:
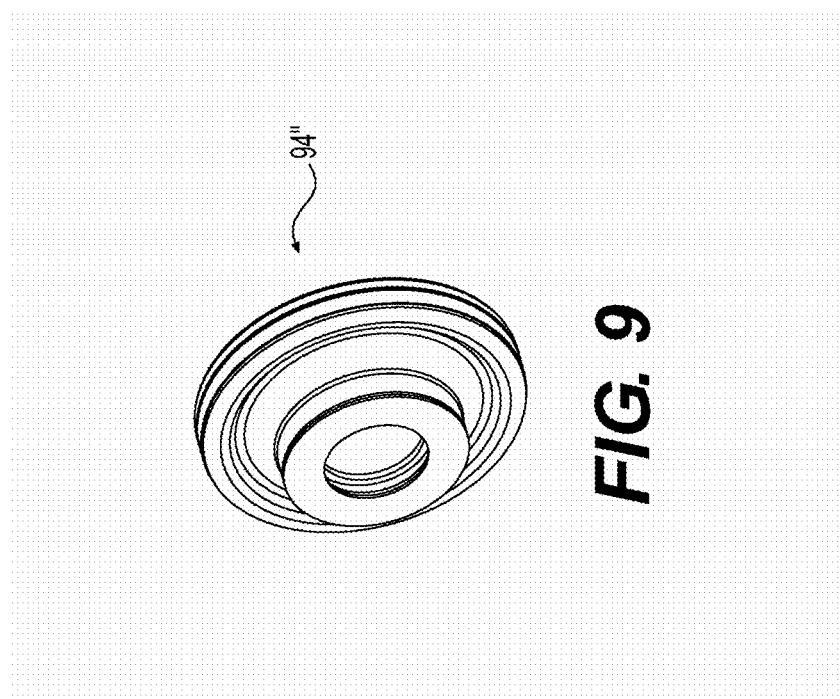
FIG. 9 is a perspective view, taken from a front, right side of another embodiment of a piston.
Figure 10:
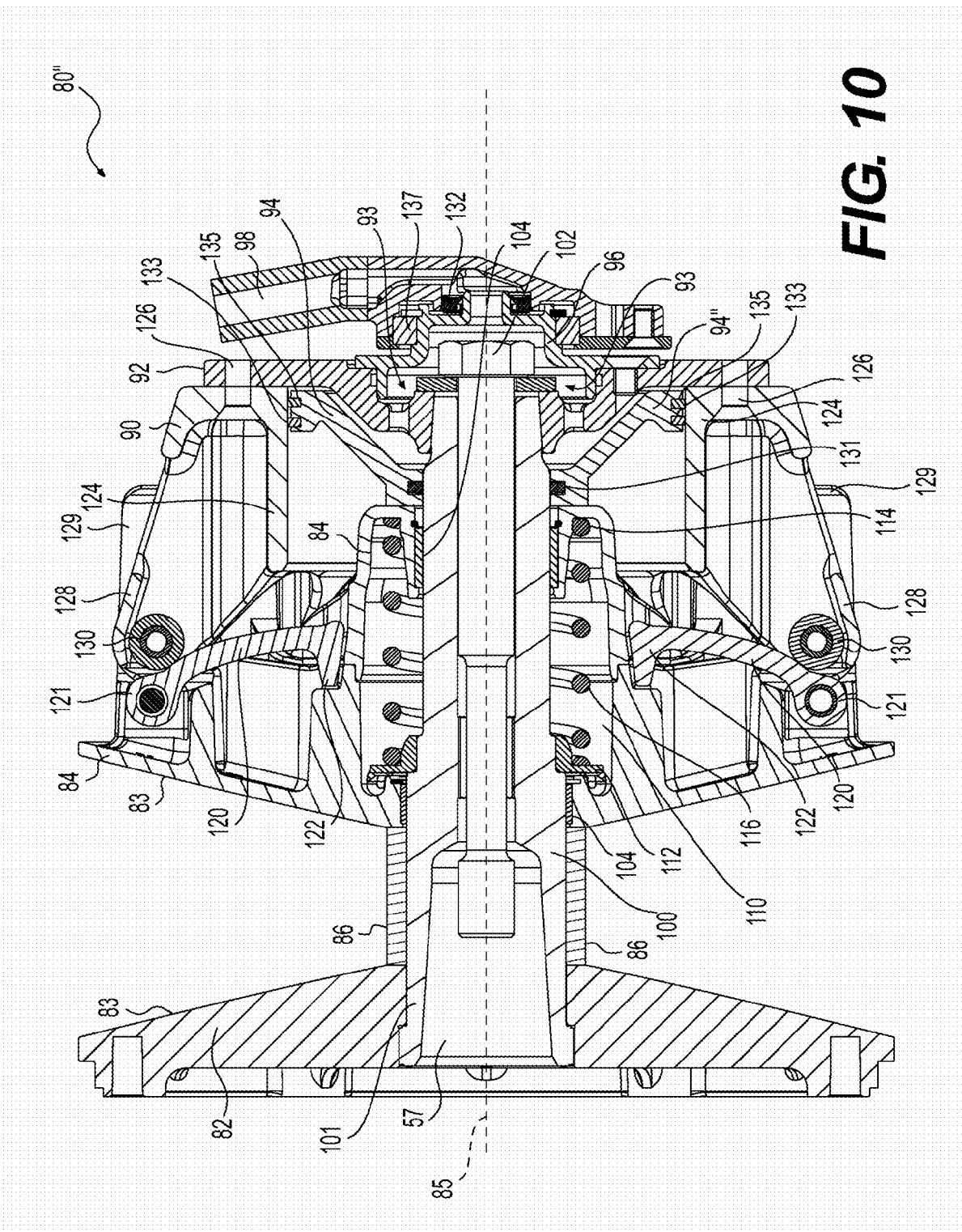
FIG. 10 is a cross-sectional view of another embodiment of a driving pulley of the CVT of the powertrain of FIG. 2 having the piston of FIG. 9.

With reference to FIGS. 9 and 10, another embodiment of a driving pulley 80" having another embodiment of a piston 94" will be described. The driving pulley 80" is similar to the driving pulley 80 of FIGS. 3A to 6, and the piston 94" is similar to the piston 94 of FIGS. 3A to 6. Corresponding features of the driving pulleys 80 and 80" have been labeled with the same reference numbers and will not be discussed again in detail except with respect to their differences.

The piston 94" of the driving pulley 80" is made of aluminum instead of plastic to obtain a balance between low weight and low thermal expansion properties. The ridges, which were provided for rigidity in the piston 94 have been omitted from the piston 94". The aluminum piston 94" of FIG. 9 experiences a smaller amount of thermal expansion than the plastic piston 94 of FIG. 5. Pistons 94 formed of plastic material having thermal expansion properties that are comparable to, or less than the Al piston 94" are also contemplated.

As best seen in FIG. 10, the outer cylindrical surface of the piston 94" has two grooves formed therein. The seal 133 is received in one of the grooves (the groove closer to the moveable sheave 84). The seal 133 extends radially outwardly of the outer cylindrical surface of the piston 94" to contact the inner cylindrical surface of the hub 124. The seal 133 thus seals the piston 94" against the hub 124. A plastic ring 135 is received in the other groove. The plastic ring 135 is discontinuous in the circumferential direction, having a circumferential gap (not shown) to allow for thermal expansion of the plastic ring 135. The plastic ring 135 extends radially outwardly of the outer cylindrical surface of the piston 94" to contact the inner cylindrical surface of the hub 124. The plastic ring 135 is relatively rigid compared to the compressible seal 133. The plastic ring 135 prevents direct contact between the piston 94" and the spider hub 124. The plastic ring 135 thereby serves to reduce friction when the piston 94" moves relative to the hub 124, both of which are made of aluminum. It is contemplated that the plastic ring 135 could be omitted. It is contemplated that the outer cylindrical surface of the piston 94" could be in contact with the inner cylindrical surface of the hub 124.

Figure 7:
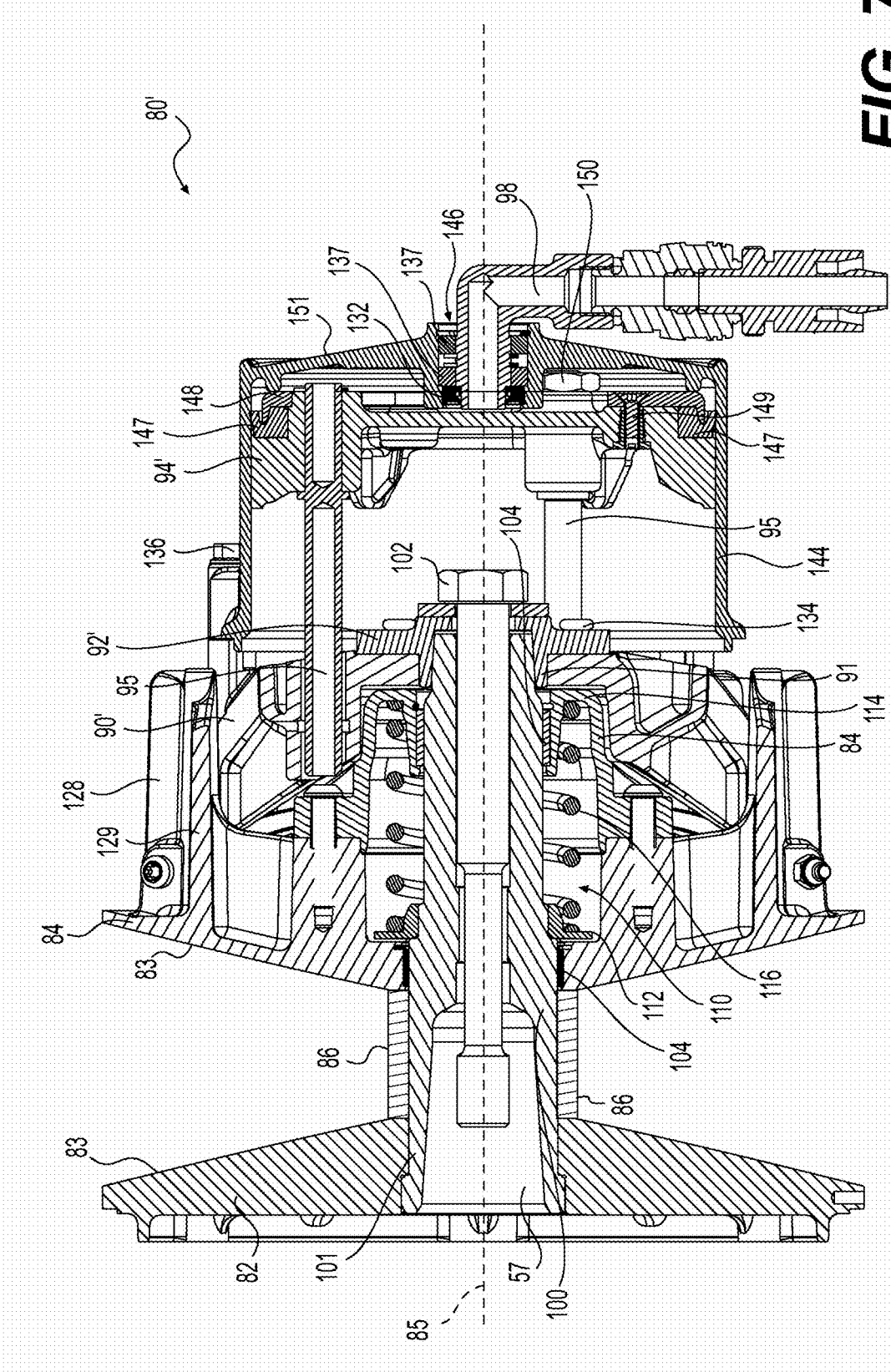
FIG. 7 is a cross-sectional view of another embodiment of a driving pulley of the CVT of the powertrain of FIG. 2.

With reference to FIG. 7, another embodiment of a driving pulley 80' having a piston 94' will be described. Features of the driving pulley 80' that are similar to the driving pulley 80 will be given the same reference labels and will not be described again.

A spider 90' and coverplate 92' are mounted on the driving shaft 100 axially outward of the moveable sheave 84. The bolt 102 which retains the driving shaft 100 to the crankshaft 57 also retains the coverplate 92' to the driving shaft 100. The coverplate 92' is smaller in diameter than the coverplate 92 of the driving pulley 80 of FIG. 3A. An annular flange 93 of the coverplate 92' extends axially inwardly along the outer surface of the driving shaft 100. The spider 90' is mounted on this annular flange 93 and attached to the coverplate 92' by bolts 134.

A cup-shaped cylinder 144 is mounted to the axially outward surface of the spider 90 so as to be coaxial with the driving shaft 100. The cylinder 144 is fastened to the spider 90' by bolts 136. The cylinder 144 has an end portion 145 that extends generally transversely to the driving shaft 100.

A piston 94' is mounted inside the cylinder 144 so as to slide along its inner cylindrical surface between the end portion 145 and the spider 90'. The piston 94' is sealed against the inner surface of the cylinder 144 by an annular seal 147. The annular seal 147 is fastened against the outer surface of the piston 94' by a plate 148 and bolt 149. The piston 94' is actuated by filling the space between the piston 94' and the end portion 145 with compressed air.

Three partially hollow rods 95, two of which can be seen in FIG. 7, are attached to the piston by bolts 150. The rods 95 extend in an axially inward direction from the piston 94' through bores 145 formed in the spider 90'. The rods 95 extend towards the moveable sheave 84 radially outwards of the coverplate 92'. It is contemplated that the radial position of the rods 95 could be different. It is contemplated that the coverplate 92' and/or the spider 90' could be configured such that the rods 95 extend through the coverplate 92' and the spider 90', or only through the coverplate 92'.

In this embodiment, as shown in FIG. 7, the stationary moveable sheave 84 (i.e. moveable sheave 84 in its outermost axial position) is spaced from the rods 95 of the piston 94' in its unactuated configuration. When the piston 94' is actuated, the rods 95, move towards the moveable sheave 84, and after making contact, exert force thereon. It is contemplated the rods 95 could be configured to be in contact with the stationary moveable sheave 84 in the unactuated configuration of the piston 94'. It is also contemplated that the rods 95 could be attached to the moveable sheave 84, so as to slide and rotate with the moveable sheave 84.

It is contemplated that the rods 95 could be formed integrally with the piston 94', or be attached to the piston 94' by other means. Although the rods 95 are made partially hollow in the illustrated embodiment, it is contemplated that the rods 95 could be solid, or have a different shape than as shown here. The rods 95 are circumferentially distributed about the rotation axis 85 of the driving shaft 100. It is contemplated that the number of rods 95 could be more or less than three.

The cylinder 144 is connected to the air conduit 98 through an aperture 146 formed in the end portion 151 of the cylinder 144. The cylinder 144 rotates with the spider 90 while the air conduit 98 is stationary. Bearings 137 are inserted between the stationary air conduit 98 and the cylinder 144. The stationary air conduit 98 is rotatably sealed against the end portion 151 of the cylinder 144 via lip seals 132. When pressurized air is fed through the air conduit 98 to the cylinder 144, the piston 94' slides along the inner cylindrical surface of the cylinder 144 away from the end portion 151 towards the spider 90' and coverplate 92'. The piston 94' exerts force, via the attached rods 95, on the moveable sheave 84 towards the fixed sheave 82, thereby helping to increase the effective diameter of the driving pulley 80.

Since the surface area of the piston 94', on the side exposed to compressed air, is larger in the driving pulley 80' of FIG. 7 than that of the piston 94 in the driving pulley 80 shown in FIGS. 3A and 3B, the air pressure required to exert a given amount of force on the piston 94' of pulley 80' is less than the air pressure required to exert that force on the piston 94 of pulley 80.

It is contemplated that the snowmobile 10 could be configured to actuate the piston 94, 94', 94" with a given air pressure, and that the actuation could be controlled to be in either "on" or "off" states.

It is contemplated that the snowmobile 10 could be configured to provide a plurality of air pressure levels and resultant forces exerted on the moveable sheave 84. It is contemplated that the force being exerted on the moveable sheave 84 could be continuously variable within a given range of values. It is contemplated that the magnitude of force exerted on the moveable sheave 84 by the piston 94, 94', 94" could be varied either by adjusting the air pressure used to actuate the piston 94, 94', 94", or by using multiple pistons and selectively actuating the multiple pistons.

It is contemplated that the actuation of the piston 94, 94', 94" could be controlled manually by the operator of the snowmobile 10. For example, a switch, such as a button switch, could be provided to switch the actuation on or off. Alternatively, a continuously adjustable knob could be provided to allow the driver of the snowmobile to set the amount of force being exerted by the piston 94, 94', 94". It is also contemplated that actuation of the piston 94, 94', 94" could be controlled automatically based on parameters such the vehicle speed, engine rotation speed (RPM), torque required, fuel reserve and the like.

Figure 8:
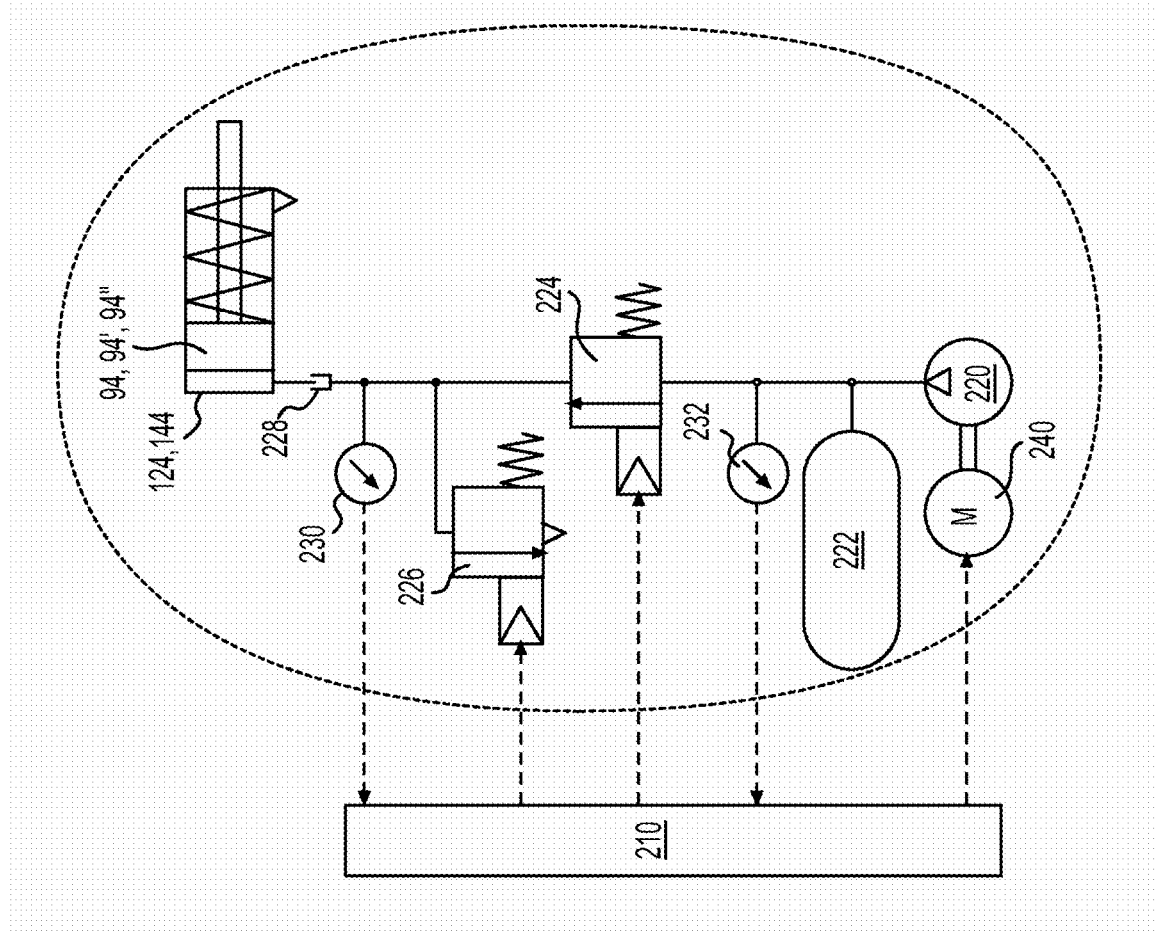
FIG. 8 is schematic illustration of a control system for the CVT of the powertrain of FIG. 2.

With reference to FIG. 8, the pneumatic system 200 for delivering pressurized air to the piston 94, 94', 94" and the control system 210 for automatically controlling pneumatic actuation of the piston 94, 94', 94" will now be discussed.

The pneumatic system 200 includes a compressor 220, an electric motor 240, an accumulator 222, an air inlet valve 224, an air outlet valve 226, a rotary feed-through 228, a cylinder pressure sensor 230 and an accumulator pressure sensor 232.

The control system 210 regulates the pneumatic air pressure delivered to the piston 94, 94', 94" for selective and adjustable actuation of the piston 94, 94', 94".

As discussed above, the cylinder 144 is connected to the compressor 220 for receiving pressurized air. The compressor 220 is operatively connected to the control system 210. The control system 210 sends electronic signals to the compressor 220 for activation thereof. It is contemplated that the control system 210 could also be configured to receive signals from the compressor 220.

As also discussed above, an accumulator 222, in fluid communication with the compressor 220 (connected downstream of the compressor), stores compressed air for actuation of the piston 94, 94', 94" and helps to reduce the response time for actuation of the piston 94, 94', 94". Thus the compressor 220 is connected to the cylinder 144 via the accumulator 222. Pressurized air flows from the compressor 220 to the accumulator 222, and from the accumulator 222 to the cylinder 124, 144. It is contemplated that an additional air flow path could be provided for pressurized air to flow from the compressor 220 to the cylinder 124, 144 without passing through the accumulator 222. It is contemplated that the accumulator 222 could be omitted.

An air inlet valve 224, connected between the accumulator 222 and the cylinder 124, 144, via the rotary feed-through 228, allows air flow from the accumulator 222 to the cylinder 124. The air inlet valve 224 is opened when the cylinder 124, 144 (as determined by the cylinder pressure sensor 230) is less than desired, and if pressurized air at a higher pressure than that in the cylinder 124, 144 is available from the accumulator 222 (as determined by the accumulator pressure sensor 232).

An air outlet valve 226 connected to the cylinder 124, 144 via the rotary feed-through 228 allows pressurized air in the cylinder 124, 144 to be vented to the atmosphere. The air outlet valve 226 is opened if the pressure in the cylinder 124, 144 is greater than desired.

The air inlet valve 224 and the air outlet valve 226 are each operatively connected to the control system 210. The valves 224, 226 can each be configured to open at particular pressure set-points. The pressure set-points for the valves 224, 226 can be assigned electronically or adjusted mechanically. The control system 210 sends control signals to the valves 224, 226 to actuate their opening and closing. It is contemplated that the control system 210 could also be configured to receive signals from the valves 224, 226. It is contemplated that the air inlet valve 224 and the air outlet valve 226 could be replaced with a single proportional relay valve.

Pressurized air flows from the air inlet valve 224 into the cylinder 124, 144 via a rotary feed-through 228, such as the connector 96 of FIG. 3A or the like. The rotary feed-through 228 is connected between the air outlet valve 226 and the cylinder 144 so that pressurized air is vented from the cylinder 124 to the atmosphere through the rotary feed-through 228.

An accumulator air pressure sensor 232 is connected to the accumulator 222 to measure the air pressure in the accumulator 222. In the illustrated embodiment, the accumulator pressure sensor 232 is connected downstream of the accumulator 222, between the accumulator 222 and the air inlet valve 224. It is however contemplated that the accumulator air pressure sensor 232 could be connected elsewhere on the accumulator 222.

A cylinder air pressure sensor 230 measures the air pressure in the cylinder 124, 144. The cylinder air pressure sensor 230 is shown connected between the air inlet valve 224 and the rotary feed-through 228 leading to the cylinder 124, 144.

The pressure sensors 230, 232 are each communicatively connected to the control system 210. The control system 210 is configured to receive data and/or signals from the pressure sensors 230, 232 indicative of the air pressure sensed by the pressure sensors 230, 232. It is contemplated that the control system 210 could also be configured to send control or data signals to the pressure sensors 230, 232. The control system 210 is further configured to send control signals to the air inlet valve 224, the air outlet valve 226, and the compressor 220 based in part on the signals received from the pressure sensors 230, 232.

As mentioned above, it is contemplated that a pressurized gas cartridge could be used instead of the compressor 220 and accumulator 222. In such an embodiment, the control system 210 would be operatively connected to the gas cartridge, and configured thereto based on signals received from other sensors such as the cylinder pressure sensor 230.

It is contemplated that the control system 210 could be operatively or communicatively connected to other sensors and/or switches for controlling actuation of the piston 94, 94', 94". For example, the control system 210 could be communicatively connected to a manual switch operable by the snowmobile driver. It is also contemplated that the pneumatic actuation of the piston 94, 94', 94" could be controlled and adjusted based on other operational parameters of the snowmobile 10, such as the vehicle speed, engine temperature, and the like. The control system 210 would therefore be configured to receive signals from other sensors configured to measure these operational parameters.

The above describes a snowmobile 10 having a CVT 40 with a pneumatic piston 94. It will however be understood that the invention could be applied to other vehicles and devices which use a CVT. It will also be understood that the piston 94, 94', 94" could be actuated hydraulically, with oil or other such incompressible fluids, instead of pneumatically with compressed gas.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A pulley for a continuously variable transmission comprising:
    a shaft;
    a first sheave disposed on the shaft, the first sheave having a belt engaging surface;
    a second sheave disposed on the shaft, the second sheave having a belt engaging surface facing the belt engaging surface of the first sheave;
    a spring biasing the first sheave and the second sheave away from one another;
    a spider mounted on the shaft, the second sheave being disposed axially between the spider and the first sheave, the second sheave being axially moveable, the spider being axially fixed, the first sheave, the second sheave and the spider being adapted to rotate with the shaft;
    a plurality of centrifugal weights connected to one of:
        the spider, and
        the second sheave, at least a portion of each of the plurality of centrifugal weights moving in a radially outward direction with respect to the shaft in response to rotation of the shaft, a radial position of the portion depending on a rotational speed of the shaft, the axial distance between the spider and the second sheave depending at least in part on the radial position of the portion;

at least one cylinder adapted to receive fluid therein; and at least one piston, the at least one piston being moveable in the at least one cylinder, the at least one piston being adapted to move in response to the at least one cylinder receiving fluid therein, and to thereby selectively exert force on one of the first and second sheaves towards the other of the first and second sheaves.

2. The pulley of claim 1, wherein the at least one piston selectively exerts force on the second sheave.

3. The pulley of claim 1, wherein the fluid is pressurized air and the at least one piston is actuated pneumatically.

4. The pulley of claim 1, wherein the spring is connected to the second sheave.

5. The pulley of claim 4, wherein:
the piston selectively exerts force on the second sheave; and
the first sheave is axially fixed.

6. The pulley of claim 5, wherein:
the at least one cylinder is formed at least partly by the spider.

7. The pulley of claim 6, further comprising:
a coverplate sealing the at least one cylinder.

8. The pulley of claim 5, wherein:
the at least one piston comprises at least one rod attached thereto;
the at least one rod is disposed inside the of the at least one cylinder; and
the at least one piston selectively exerts force on the second sheave via the at least one rod.

9. The pulley of claim 1, wherein:
the at least one piston comprises at least one rod attached thereto;
the at least one rod is disposed inside the at least one cylinder; and
the at least one piston selectively exerts force on the one of the first and second sheaves via the at least one rod.

10. The pulley of claim 1, further comprising a fluid conduit connected to the at least one cylinder.

11. The pulley of claim 10, further comprising a connector connecting the fluid conduit with the cylinder.

12. The pulley of claim 11, wherein the connector is rotatable with the shaft.

13. The pulley of claim 12, wherein the fluid conduit is rotationally fixed.

14. The pulley of claim 10, wherein the fluid conduit is rotationally fixed.

15. The pulley of claim 1, wherein each of the plurality of centrifugal weights is connected to the second sheave.

16. The pulley of claim 1, wherein each of the plurality of centrifugal weights is one of:
a roller weight, the roller weight being movable in a radially outward direction; and
a lever,
a first end of the lever being attached to the one of the spider and the second sheave, and
a second end of the lever being pivotable away from the one of spider and the second sheave and in a radially outward direction with respect to the shaft.

17. A continuously variably transmission (CVT) comprising:
a driving pulley according to claim 1;
a driven pulley comprising:
a driven pulley shaft;
a first driven pulley sheave and a second driven pulley sheave mounted on the shaft to rotate therewith, a belt engaging surface of the first driven pulley sheave facing a belt engaging surface of the second driven pulley sheave; and
an endless belt rotationally coupling the driving pulley and the driven pulley, the endless belt being held between the belt engaging surfaces of the first and second sheaves of the driving pulley and the belt engaging surfaces of the first and second driven pulley sheaves.

18. A vehicle comprising:
a frame;
an engine supported by the frame;
a ground engaging member operatively connected to the engine and connected to the frame; and
a continuously variably transmission (CVT) according to claim 17, the shaft of the driving pulley being operatively connected to a crankshaft of the engine, and the driven pulley shaft being connected to the ground engaging member.

19. The vehicle of claim 18, further comprising a fluid source in fluid communication with the at least one piston.

20. The vehicle of claim 18, further comprising a control system to control actuation of the at least one piston.

21. The vehicle of claim 20, wherein the control system adjusts the force exerted by the piston.

22. The vehicle of claim 21, wherein the control system adjusts the force based on at least one of:
manual input;
vehicle driving speed;
an operational speed of the engine; and
torque required to drive the ground engaging member.

* * * * *

UNITED STATES PATENT AND TRADEMARK OFFICE
CERTIFICATE OF CORRECTION

PATENT NO. : 9,476,486 B2
APPLICATION NO. : 14/432383
DATED : October 25, 2016
INVENTOR(S) : Hochmayr et al.

Page 1 of 1

It is certified that error appears in the above-identified patent and that said Letters Patent is hereby corrected as shown below:

In the Claims

Claim 8, Column 15, Line 33, delete "inside the of the at least" and insert -- inside the at least --

Signed and Sealed this
Twenty-fourth Day of January, 2017

Michelle K. Lee
*Director of the United States Patent and Trademark Office*